(12) United States Patent
Pitakdumrongkija et al.

(10) Patent No.: US 10,263,730 B2
(45) Date of Patent: Apr. 16, 2019

(54) COMMUNICATION SYSTEM AND METHOD, BASE STATION, AND USER TERMINAL

(71) Applicant: NEC Corporation, Tokyo (JP)

(72) Inventors: Boonsarn Pitakdumrongkija, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 15/521,844

(22) PCT Filed: Oct. 29, 2014

(86) PCT No.: PCT/JP2014/005468
§ 371 (c)(1),
(2) Date: Apr. 25, 2017

(87) PCT Pub. No.: WO2016/067318
PCT Pub. Date: May 6, 2016

(65) Prior Publication Data
US 2017/0244513 A1 Aug. 24, 2017

(51) Int. Cl.
*H04L 1/00* (2006.01)
*H04B 7/0452* (2017.01)
(Continued)

(52) U.S. Cl.
CPC ......... *H04L 1/0003* (2013.01); *H04B 7/0452* (2013.01); *H04B 7/0456* (2013.01);
(Continued)

(58) Field of Classification Search
CPC .... H04L 1/0003; H04L 5/0048; H04B 7/0617
See application file for complete search history.

(56) References Cited

U.S. PATENT DOCUMENTS 8,464,105 B2 6/2013 Wu et al.
8,755,451 B2 6/2014 Jung et al.
(Continued)

FOREIGN PATENT DOCUMENTS

EP 2187533 A1 5/2010
JP 2010-537598 A 12/2010
(Continued)

OTHER PUBLICATIONS

Q. H. Spencer, A. L. Swindlehurst, and M. Haardt, "Zero-forcing methods for downlink spatial multiplexing in multiuser MIMO channels," IEEE Transactions on Signal Processing, vol. 52, No. 2, pp. 461-471, Feb. 2004.
(Continued)

*Primary Examiner* — Parth Patel
(74) *Attorney, Agent, or Firm* — Wilmer Cutler Pickering Hale and Dorr LLP

(57) ABSTRACT

Provided a method in a mobile communication system comprising a base station adapted to create a precoding matrix for applying to data to be transmitted to a user terminal by using a channel estimate determined from a Reference Signal (RS) transmitted from the user terminal to the base station, the user terminal being adapted to transmit to the base station a Channel State Information (CSI) report, wherein the method comprises: the base station creating a relationship between the received CSI report and Interference pluses Noise covariance matrix that reflects amount of interference and noise observed at the user terminal's antennas, the base station determining the Interference pluses Noise covariance matrix based on the created relationship, and the base station using the determined Interference pluses Noise covariance matrix to estimate SINR for each data layer conditioned on the precoding matrix.

6 Claims, 12 Drawing Sheets

(51) Int. Cl.
H04L 25/03 (2006.01)
H04B 7/0456 (2017.01)
H04B 7/06 (2006.01)
H04L 5/00 (2006.01)

(52) U.S. Cl.
CPC ......... H04B 7/0617 (2013.01); H04L 1/0026 (2013.01); H04L 5/0048 (2013.01); H04L 5/0053 (2013.01); H04L 25/0391 (2013.01)

(56) References Cited

U.S. PATENT DOCUMENTS

| | | | |
|---|---|---|---|
| 8,989,296 B2* | 3/2015 | Koo | H04B 7/0456 375/267 |
| 9,077,404 B2* | 7/2015 | Jia | H04B 7/024 |
| 9,918,240 B2* | 3/2018 | Lee | H04B 7/0469 |
| 2008/0096488 A1* | 4/2008 | Cho | H04B 7/0417 455/69 |
| 2009/0052405 A1* | 2/2009 | Ko | H04B 7/0621 370/335 |
| 2010/0142640 A1* | 6/2010 | Zhao | H04B 7/0417 375/285 |
| 2010/0306613 A1 | 12/2010 | Wu et al. | |
| 2010/0309998 A1 | 12/2010 | Jung et al. | |
| 2011/0034192 A1* | 2/2011 | Lim | H04B 7/0417 455/501 |
| 2011/0038436 A1* | 2/2011 | Kim | H04B 7/024 375/260 |
| 2011/0105164 A1* | 5/2011 | Lim | H04B 7/0417 455/501 |
| 2011/0110403 A1* | 5/2011 | Jongren | H04L 25/03343 375/219 |
| 2011/0194504 A1* | 8/2011 | Gorokhov | H04B 7/0417 370/329 |
| 2012/0020319 A1* | 1/2012 | Song | H04W 72/1231 370/330 |
| 2012/0021738 A1* | 1/2012 | Koo | H04B 7/024 455/422.1 |
| 2012/0021753 A1* | 1/2012 | Damnjanovic | H04W 72/082 455/450 |
| 2012/0058732 A1* | 3/2012 | Wei | H04B 7/0621 455/63.1 |
| 2012/0069757 A1* | 3/2012 | Jiang | H04B 7/0404 370/252 |
| 2012/0099469 A1 | 4/2012 | Luo et al. | |
| 2012/0257664 A1* | 10/2012 | Yue | H04B 7/0452 375/227 |
| 2012/0275313 A1* | 11/2012 | Prasad | H04B 7/0417 370/241 |
| 2013/0003812 A1* | 1/2013 | Collotta | H04B 7/0417 375/227 |
| 2013/0034187 A1* | 2/2013 | Taoka | H04B 7/024 375/296 |
| 2014/0098689 A1* | 4/2014 | Lee | H04B 7/0469 370/252 |
| 2014/0146756 A1* | 5/2014 | Sahin | H04L 1/0025 370/329 |
| 2014/0153427 A1* | 6/2014 | Seo | H04L 1/20 370/252 |
| 2014/0198750 A1* | 7/2014 | Prasad | H04B 7/0626 370/329 |
| 2014/0269994 A1* | 9/2014 | HomChaudhuri | H04W 52/0209 375/316 |
| 2015/0131751 A1* | 5/2015 | Bayesteh | H04B 7/0413 375/267 |
| 2015/0146646 A1* | 5/2015 | Chen | H04W 52/346 370/329 |
| 2015/0288505 A1* | 10/2015 | Park | H04L 5/0073 370/336 |
| 2016/0065257 A1* | 3/2016 | Fujii | H04B 7/0413 375/267 |
| 2016/0088646 A1* | 3/2016 | Sun | H04B 7/0456 370/329 |
| 2016/0094287 A1* | 3/2016 | Kim | H04B 7/024 370/329 |
| 2016/0352487 A1* | 12/2016 | Chen | H04B 7/0417 |
| 2017/0126439 A1* | 5/2017 | Yoshimoto | H04W 24/10 |
| 2017/0141903 A1* | 5/2017 | Xu | H04L 1/0005 |

FOREIGN PATENT DOCUMENTS

| | | |
|---|---|---|
| JP | 2011-509040 A | 3/2011 |
| JP | 2012-531132 A | 12/2012 |

OTHER PUBLICATIONS

3GPP TS 36.213 V11.7.0, "Technical specification: Physical layer procedures (Release 11)," 3rd Generation Partnership Project; Technical Specification Group Radio Access Network; Evolved Universal Terrestrial Radio Access (E-UTRA), pp. 1-182, Jun. 2014.

International Search Report and Written Opinion for PCT/JP2014/005468, dated Jul. 20, 2015. (15 Pages).

Japanese Office Action issued by the Japan Patent Office for Japanese Application No. 2017-541180 dated Mar. 6, 2018 (7 pages).

NEC Group, "Enhancing MU-MIMO CQI," 3GPP TSG-RAN WG1 Meeting #62bis, R1-105412, Agenda Item 6.3.2.1, Xian, China, Oct. 11-15, 2010, pp. 2-13 (12 pages).

* cited by examiner

FIG. 3

RELATED ART

MCS-SINR mapping table that satisfies block error rate ≤ 0.1

| Modulation | Code rate | Spectral usage efficiency ($C$) (bit/s/Hz) | SINR (dB), where $C = \log_2(1 + \text{SINR})$ |
|---|---|---|---|
| QPSK | 78 / 1024 | 0.1523 | -9.5321 |
| QPSK | 120 / 1024 | 0.2344 | -7.5351 |
| QPSK | 193 / 1024 | 0.3770 | -5.2492 |
| QPSK | 308 / 1024 | 0.6016 | -2.8621 |
| QPSK | 449 / 1024 | 0.8770 | -0.7754 |
| QPSK | 602 / 1024 | 1.1758 | 1.0008 |
| 16QAM | 378 / 1024 | 1.4766 | 2.5111 |
| 16QAM | 490 / 1024 | 1.9141 | 4.4227 |
| 16QAM | 616 / 1024 | 2.4063 | 6.3356 |
| 64QAM | 466 / 1024 | 2.7305 | 7.5103 |
| 64QAM | 567 / 1024 | 3.3223 | 9.5436 |
| 64QAM | 666 / 1024 | 3.9023 | 11.4466 |
| 64QAM | 772 / 1024 | 4.5234 | 13.4238 |
| 64QAM | 873 / 1024 | 5.1152 | 15.2712 |
| 64QAM | 948 / 1024 | 5.5547 | 16.6279 |

COMMUNICATION SYSTEM AND METHOD, BASE STATION, AND USER TERMINAL

REFERENCE TO RELATED APPLICATIONS

This application is a national stage application of International Application No. PCT/JP2014/005468 entitled "COMMUNICATION SYSTEM AND METHOD, BASE STATION, AND USER TERMINAL" filed Oct. 29, 2014, the disclosure of which is incorporated by reference.

TECHNICAL FIELD

The present invention relates to a communication system and method, a base station, and a user terminal.

BACKGROUND

Recently, exploding growth of mobile data communication traffic due to proliferation of smart phones and other smart devices has accelerated mobile network operators to deploy or consider deploying various technologies to increase network capacity. One of key enabling technologies is MIMO (Multi-Inputs and Multi-Outputs) technology.

Specifically, MIMO technology has already been standardized in Third Generation Partnership Project (3GPP) Long-Term Evolution (LTE) and LTE-Advanced standards. MIMO technology comprises two sub-categories, namely, Single-User-MIMO (SU-MIMO) and Multi-User MIMO (MU-MIMO). SU-MIMO technology enables transmission of multiple layers of data on the same time and frequency resource between a base station and a single user terminal. On the other hand, MU-MIMO technology, while offering the same benefit as SU-MIMO, can additionally enable data transmission on the same time and frequency resource between a base station and multiple user terminals. Therefore, in order to maximize network capacity, mobile network operators worldwide are considering deployment of MU-MIMO technology.

MU-MIMO is the most effective when channels from a base station to all user terminals can be precisely known. For a downlink communication direction (from base station to user terminals), which dominates most of mobile data communication traffic, this can be realized easily especially in Time-Division Duplexing (TDD) system comprising a base station configured to exploit channel reciprocity property between channels in the downlink direction and channels in an reverse (uplink) direction.

FIG. 1 illustrates a typical example of a system in a related art which channel reciprocity between one base station and one user terminal is exploited by the base station.

Specifically, referring to FIG. 1, the user terminal 20R transmits Uplink Reference Signal (Uplink RS, which is equivalent to Sounding Reference Signal (SRS) in LTE system) from M antennas 21R (operation S11).

The base station 10R receives from the user terminal 20R Uplink RS transmitted from each of the user terminal's antennas 21R (operation S12).

Then, the base station 10R estimates channel from every user terminal's antenna 21R to every base station's antenna 11R to obtain Uplink channel matrix $H_U$ (operation S13). $H_U$ is an $N_T \times M$ impulse response matrix, where $N_T$ is the number of antennas 11R of the base station 10R and M is the number of antennas 21R of the user terminal 20R.

Finally, the base station 10R invokes channel reciprocity property to obtain Downlink channel matrix $H_D$ by using the Uplink channel matrix $H_U$, $$H_D = H^H_U,$$

where $H_D$ is an $M \times N_T$ impulse response matrix and the superscript H denotes complex conjugate transpose or Hermitian transpose (operation S14).

Once the base station 10R obtains all Downlink channel matrices to all user terminals, the base station 10R can create a precoding matrix (hereinafter also referred to as "Base-station-created precoding matrix") for each user terminal. Data of one user terminal with the precoding matrix applied thereto is made not to interfere with data of other user terminals. There are several methods to create the precoding matrix.

FIG. 2 is a diagram for illustrating an example of Block-Diagonalization (BD) precoding method described in Non-patent Literature (NPL) 1. FIG. 2 illustrates a case where the base station 10R creates two Base-station-created precoding matrices $F_1$ and $F_2$ for User terminals 1 and 2 (12-1 and 12-2), respectively, when respective Downlink channel matrices $H_1$ and $H_2$ to User terminals 1 and 2 are known at the base station 10R.

To ensure that data of one user terminal do not interfere with those of the other user terminal, the base station 10R creates the Base-station-created precoding matrix ($F_1$, $F_2$) for the user terminal that is equivalent to a null-space matrix of the other user terminal's channel ($V_2^{(n)}$, $V_1^{(n)}$). That is, $$F_1 = V_2^{(n)}, \text{ and } F_2 = V_1^{(n)},$$

where $V_i^{(n)}$ (i=1,2) forms orthogonal basis for null space of $H_i$ (channel matrix from base station to user terminal i).

More specifically, assuming that the number of antennas 11R of the base station 10R is $N_T$, the number of antennas (21R-i) (i=1, 2) of i-th user terminal (20R-i) is $N_{ri}$ (=M), $N_r = N_{r1} + N_{r2}$ (=2M), and $H_i$ is a Downlink channel matrix ($N_{ri} \times N_T$ impulse response matrix with a rank $L_i$), $H_i$ is decomposed using SVD (singular value decomposition), $$H_i = U_i D_i [V_i^{(s)} V_i^{(n)}]^H,$$

where $U_i$ (i=1, 2) is an $(N_r - N_{ri}) \times (N_r - N_{ri})$ Unitary matrix, $D_i$ (i=1, 2) is an $(N_r - N_{ri}) \times N_T$ matrix having $L_i$ (=rank of $H_i$) positive singular values and zeros in diagonal elements and having zeros in off-diagonal elements, $V_i^{(s)}$ (i=1, 2) is an $N_T \times L_i$ matrix having, as column vectors, $N_T$-orthonormal vectors corresponding to $L_i$ positive singular values, and $V_i^{(n)}$ (i=1,2) is an $N_T \times (N_T - L_i)$ matrix having, as column vectors, $N_T$-orthonormal vectors corresponding to zero singular values.

In the base station 10R, each modulated codeword (codeword from a coder not shown) is modulated by a modulator not shown) is mapped onto one or more layers. The number of layers is less than or equal to the number of transmit antenna ports. Each layer is mapped by precoding-matrix onto one or more transmit antenna ports associated with physical transmission antennas. Each of adders 13-1 to 13-$N_T$ connected to each of $N_T$ antennas adds associated mapped layers for user terminals 1 and 2.

When one user terminal (20R1/20R2) receives signals transmitted from the base station, the one user terminal does not experience interference from the other user terminal.

Therefore, the user terminal can adjust a receiving matrix G to only extract multiple layers of data intended for the user terminal itself, by for example, using a Zero-Forcing (ZF) or Minimum Mean-Squared Error (MMSE) criterion.

Note: The following gives an outline about a Zero-Forcing (ZF) receiver. Assuming that the received signal (vector) r observed at the user terminal is modeled as:

$$y = Hx + v,$$

where x is a transmit vector, H is a channel matrix from the base station to the user terminal, and v is a noise vector (additive white Gaussian noise (AWGN)). When channel state information is perfect, the ZF estimate of the transmitted vector can be expressed as $$\tilde{y} = G(Hx+v) = x + Gv,$$

where $G=[H_H H]^{-1} H^H$ is the ZF receiver. The superscript −1 denotes inverse of a matrix. $H^+=[H_H H]^{-1} H^H$ is a pseudo inverse matrix (left inverse of H, that is, $H^+H=I$, where I is an Identity Matrix).

Although interference between user terminals (Inter-user interference: IUI) can be handled by the Base-station-created precoding matrices, the base station still needs to select appropriate Modulation and Coding Scheme (MCS) for each data layer in order to maximize each user terminal's throughput, and thus network capacity.

The selection of MCS by the base station is for example performed as follows.

The base station first acquires received channel quality observed by each user terminal conditioned on the Base-station-created precoding matrix. The received channel quality reflects a power of a desired signal with respect to a power of interference and noise experienced at the user terminal. The interference in this case refers to an undesired signal that may be generated due to imperfect nulling of Inter-user interference by the base station that is serving the user terminal or transmission of signals from neighboring base stations that are serving different user terminals.

Then, the received channel quality is used to determine the highest MCS that satisfies a predefined data transmission error rate. The received channel quality metric most commonly used is Signal to Interference pluses Noise Ratio (SINR), defined as the desired signal power divided by the total power of power of interference and noise.

FIG. 3 depicts an example of MCS-SINR mapping table that depicts an example of how SINR is mapped to MCS. FIG. 3 is taken from NPL2's Section 7.2.3 Channel Quality Indicator (CQI) definition.

Referring to FIG. 3, in "Modulation", there are provided QPSK (Quadrature Phase Shift Keying) and 16QAM (Quadrature Amplitude Modulation) and 64QAM.

"Code rate" is k/n, for every k bits of useful information, while the coder generates totally n bits of data, of which n-k are redundant.

"Spectral efficiency (usage) (C) (bit/s/Hz)" is a net bit-rate (bit/s) (useful information rate excluding error-correcting codes) or maximum throughput, divided by a bandwidth in Hertz of a communication channel.

Regarding "SINR", from the well known Shannon's channel capacity equation, Spectral efficiency (C) is given as $C=\log_2(1+SINR)$. Accordingly, SINR(dB) is given as $\log_{10}(2^C-1)$.

Therefore, in conclusion, the base station needs to obtain SINR observed by the user terminal conditioned on the Base-station-created precoding matrix in order to select an appropriate MCS for each data layer and maximize channel (network) capacity.

The mobile communication system, such as LTE, has some mechanism in which a user terminal reports received SINR observed by the user terminal to the base station. NPL2's Section 7.2 UE procedure for reporting Channel State Information (CSI) describes such mechanism in details.

FIG. 4 is a simplified sequence chart illustrating the CSI reporting operations disclosed in NPL2. Here, the system according to the example includes one base station and two user terminals only for the sake of simplicity.

Both user terminals 1 and 2 (20R-1 and 20R-2) first receive Downlink Reference Signal (Downlink RS, which is equivalent to Channel State Information Reference Signal (CSI-RS) in LTE system) broadcasted from each of the base station's antennas to every user terminals (operation S21).

Then, the user terminals 1 and 2 (20R-1 and 20R-2) estimate, respectively Down link channel matrices $H_1$ and $H_2$ from the base station's antennas to the user terminals 1 and 2 (20R-1 and 20R-2), based on the received Downlink RS, respectively (operations S22-1 and 2).

The base station 10R transmits a request for reporting channel quality information to the respective user terminals 1 and 2 (20R-1 and 20R-2) (operations S23-1 and 2).

After that, the user terminals 1 and 2 (20R-1 and 20R-2) create respectively precoding matrices $F_{user1-created}$ and $F_{user2-created}$ (hereinafter also termed as User-created precoding matrix) by using the estimated channel in order to maximize received SINR (operations S24-1 and 2).

Next, the user terminals 1 and 2 (20R-1 and 20R-2) estimate received SINR for each data layer conditioned on the User-created precoding matrices $F_{user1-created}$ and $F_{user2-created}$, respectively (operations S25-1 and 2).

Finally, the user terminal 1 (20R-1) reports both the User-created precoding matrix $F_{user1-created}$, and the received SINR conditioned on $F_{user1-created}$ to the base station (operation S26-1) and the user terminal 2 (20R-2) reports both the User-created precoding matrix $F_{user2-created}$ and the received SINR conditioned on the User-created precoding matrix $F_{user2-created}$ to the base station (operation S26-2).

More specifically in LTE, the user terminal performs the process of creating the User-created precoding matrix by selecting one precoding matrix from a predefined set of precoding matrices (candidates: called codebook) known to both the user terminal and the base station. The user terminal reports the User-created precoding matrix and the corresponding SINR to the base station using Precoding Matrix Indicator (PMI) index and Channel Quality Indicator (CQI) index, respectively. Higher the CQI index (from 0 to 15) reported by the user terminal to the base station, the base station uses higher modulation scheme (from QPSK to 64QAM) and higher code rate to achieve higher efficiency.

In Patent Literature (PTL) 1, there is disclosed a MIMO system including eNodeB and K user equipments, wherein the eNodeB carries out precoding and realizes a space division multiplex among K user equipments. In PTL1, the eNodeB comprises an apparatus including uplink channel estimation means for receiving a signal from one or more user apparatuses in a space division multiplex group to estimate an uplink channel characteristic based on the received signal, calibration information determination means for determining calibration information between the uplink channel characteristic and downlink channel characteristic, and precoding means for determining a downlink precoding matrix based on the uplink channel characteristic and calibration information, and transmitting a downlink signal to the one or more user apparatuses in a space division multiplex group.

In PTL2, there is disclosed a MIMO system in which many base stations each can receive channel state information (Channel Status Information: CSI) from a mobile station, and can estimate a channel using the channel state information. Each base station is adapted to generate antenna weights separately based on such a channel estimation result, and perform precoding to transmit precoded signal.

In PTL3, there is disclosed a method including a step for feed backing static characteristic of CSI and CSI error to a base station (BS) from a user equipment (UE), a step for generating a multi-user precoding matrix and a scheduling scheme according to the static characteristic of the feed-backed CSI and CSI error, and a step for carrying out multi-user precoding and scheduling to user data by using the generated multi-user precoding matrix and scheduling scheme.

[PTL 1]
Japanese Unexamined Patent Application Publication (Translation of PCT Application) No. JP2012-531132A
[PTL 2]
Japanese Unexamined Patent Application Publication (Translation of PCT Application) No. JP2011-509040A
[PTL 3]
Japanese Unexamined Patent Application Publication (Translation of PCT Application) No. JP2010-537598A Non Patent Literature

[NPL 1]
Q. H. Spencer, A. L. Swindlehurst, and M. Haardt, "Zero-forcing methods for downlink spatial multiplexing in multiuser MIMO channels," IEEE Transactions on Signal Processing, vol. 52, no. 2, February 2004.
[NPL 2]
3GPP TS 36.213 V11.7.0, "Technical specification: Physical layer procedures (Release 11)," 3rd Generation Partnership Project; Technical Specification Group Radio Access Network; Evolved Universal Terrestrial Radio Access (E-UTRA), June 2014.

SUMMARY

The following describes analysis of the related arts.

The mechanism of the mobile communication system in the related art, such as NPL2 fails to provide the base station with sufficient information in order to select appropriate MCS for the Base-station-created precoding matrix. This is because the received SINR reported by the user terminal in the related art is conditioned on the User-created precoding matrix instead of the Base-station-created precoding matrix. These two kinds of precoding matrices can be very different from each other in MU-MIMO operation.

Specifically, while the Base-station-created precoding matrix takes into account channels to all user terminals in order to prevent data from one user terminal from interfering with the other user terminals, the User-created precoding matrix only takes into account channels to one user terminal itself. Therefore, it is impossible in MU-MIMO to create a precoding matrix to effectively avoid Inter-UE (User Equipment) interference only from the User-created precoding matrix.

The present invention has been accomplished in consideration of the above mentioned problem, and an objective thereof is to provide a method and system for enabling a base station to estimate received SINR observed by a user terminal that is conditioned on a Base-station-created precoding matrix.

In accordance with an aspect of the present invention, there is provided a method comprising a base station communicating via a radio link with at least a user terminal adapted to transmit to the base station a Channel State Information (CSI) report representing a channel state for communication from the base station to the user terminal, the base station being adapted to create a precoding matrix for applying to data to be transmitted to the user terminal (Base station-created precoding matrix) by using a channel estimate determined from Reference Signal (RS) transmitted from the user terminal to the base station, the method comprising:

the base station creating a relationship between the received CSI report and Interference pluses Noise covariance matrix that reflects amount of interference and noise observed at the user terminal's antennas;

the base station determining the Interference pluses Noise covariance matrix based on the created relationship; and the base station using the determined Interference pluses Noise covariance matrix to estimate a Signal to Interference pluses Noise Ratio (SINR) for each data layer conditioned on the Base station-created precoding matrix.

In accordance with another aspect of the present invention, there is provided a base station comprising:

a reception unit to receive from a user terminal a Channel State Information (CSI) report representing a channel state for communication from the base station to the user terminal; and a precoding matrix creation unit to create a precoding matrix for applying to data to be transmitted to the user terminal (Base station-created precoding matrix), by using a channel estimate determined by the base station from a Reference Signal (RS) transmitted from the user terminal to the base station;

a relationship creation unit to create a relationship between the received CSI report and an Interference pluses Noise covariance matrix that reflects an amount of interference and noise observed at a plurality of antennas of the user terminal;

a determination unit to determine the Interference pluses Noise covariance matrix based on the created relationship; and a channel quality estimation unit to use the determined Interference pluses Noise covariance matrix to estimate a Signal to Interference pluses Noise Ratio (SINR) for each data layer conditioned on the Base station-created precoding matrix.

In accordance with another aspect of the present invention, there is provided a user terminal comprising:

a plurality of antennas;

a report creation unit to create a Channel State Information (CSI) report representing a channel state for communication from a base station to the user terminal by taking into account a specification from the base station related to an Interference pluses Noise covariance matrix that reflects an amount of interference and noise observed at the plurality of antennas: and a transmitter to transmit the created CSI report to the base station.

In accordance with a further aspect of the present invention, there is provided a system comprising a base station and a user terminal as set forth respectively in the above aspects. In accordance with a further aspect of the present invention, there is provided a non-transitory computer readable storage medium that stores a program to cause a base station to execute the processing as set forth in the afore-mentioned aspects. There is also provided a non-transitory computer readable storage medium that stores a program to cause a user terminal to execute the processing as set forth in the afore-mentioned aspects.

According to the present invention, information of received SINR observed by a user terminal conditioned on a Base-station-created precoding matrix can be made available at a base station, as a result of which, the base station can further use the information to select appropriate MCS for the Base-station-created precoding matrix and to improve both user terminal's throughput and network capacity.

BRIEF DESCRIPTION OF DRAWINGS

FIG. 3 illustrates in a table format mapping between MCS and SINR in a related art.

PREFERRED MODES

The following describes exemplary embodiments of the present invention with reference to the drawings. For illustrating modes of the present invention, the embodiments are constructed by assuming the application in the TDD LTE system.

First, a mobile communication system and devices, which are used in common for describing the present invention, will be described with reference to FIGS. 5 to 7.

Figure 5:
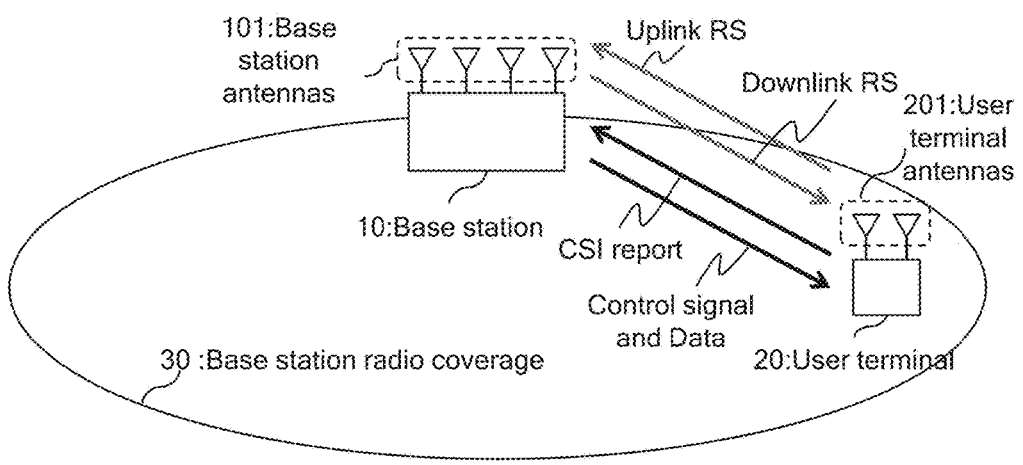
FIG. 5 is a diagram illustrating an example of a mobile communication system in common for all exemplary embodiments of the present invention.

FIG. 5 illustrates an example of a mobile communication system according to the exemplary embodiments. Referring to FIG. 5, the system comprises a base station (10) with multiple antennas (101), and a user terminal (20) with multiple antennas (201). The user terminal (20) is located in a base station radio coverage (30) and can communicate with the base station (10) in both uplink and downlink directions. Specifically, the user terminal (20) can transmit Uplink reference signal (Uplink RS, which is equivalent to Sounding Reference Signal (SRS) in LTE system) from M antennas 21R and CSI report to the base station (10) via uplink channel. The base station (10) can transmit Downlink RS (equivalent to CSI-RS in LTE system) and control signal and data to the user terminal (20) via downlink channel.

Note that in FIG. 5, the system is provided with a single user terminal only for the sake of simplifying explanation. In fact, the present invention can obviously be applied to a system with multiple user terminals.

Figure 6:
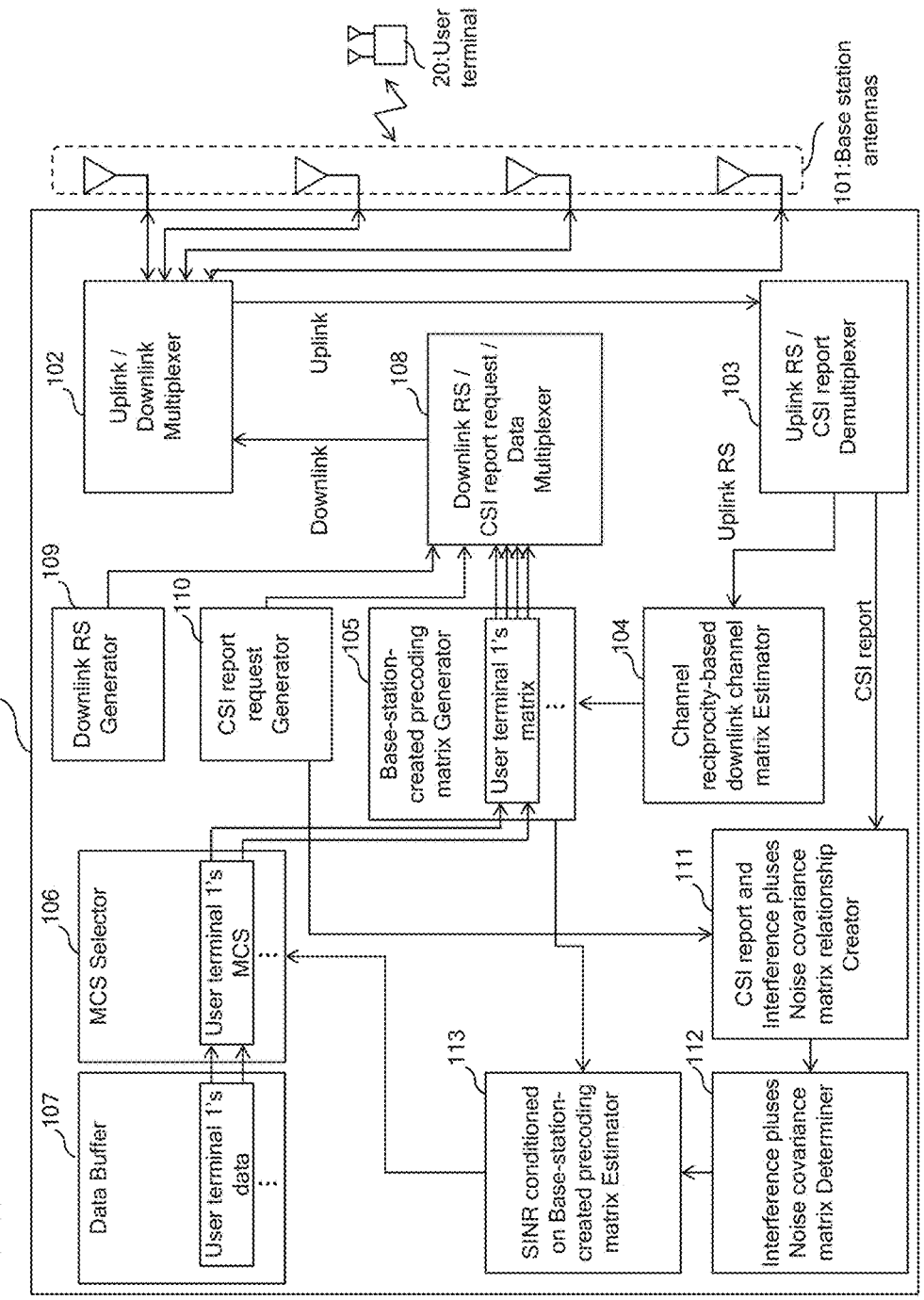
FIG. 6 is a diagram illustrating an example of a base station used in common for all exemplary embodiments of the present invention.

FIG. 6 illustrates an example of an arrangement of the base station (10). Referring to FIG. 6, a plurality of base station antennas (101) are used for both receiving uplink signals and transmitting downlink signals from and to the user terminal (20), respectively.

Uplink/Downlink Multiplexer (102) multiplexes reception of Uplink signals and transmission of Downlink signals, in time.

Uplink RS/CSI report Demultiplexer (103) demultiplexes the reception of Uplink signals into, reception of Uplink RS and reception of CSI report. Demultiplexed Uplink RS and CSI report are supplied to Channel reciprocity-based downlink channel matrix Estimator (104) and CSI report and Interference pluses Noise covariance matrix relationship Creator (111), respectively.

Downlink RS/CSI report request/Data Multiplexer (108) multiplexes Downlink RS, CSI report request, and transmit data into Downlink signals.

Channel reciprocity-based downlink channel matrix Estimator (104), upon reception of the Uplink RS from the Uplink RS/CSI report Demultiplexer (103), estimates a downlink channel matrix from the base station (10) to each user terminal (20), by exploiting uplink-downlink channel reciprocity property. The estimation process of the downlink channel matrix is similar to that in the related art described with reference to FIG. 1.

Figure 2:
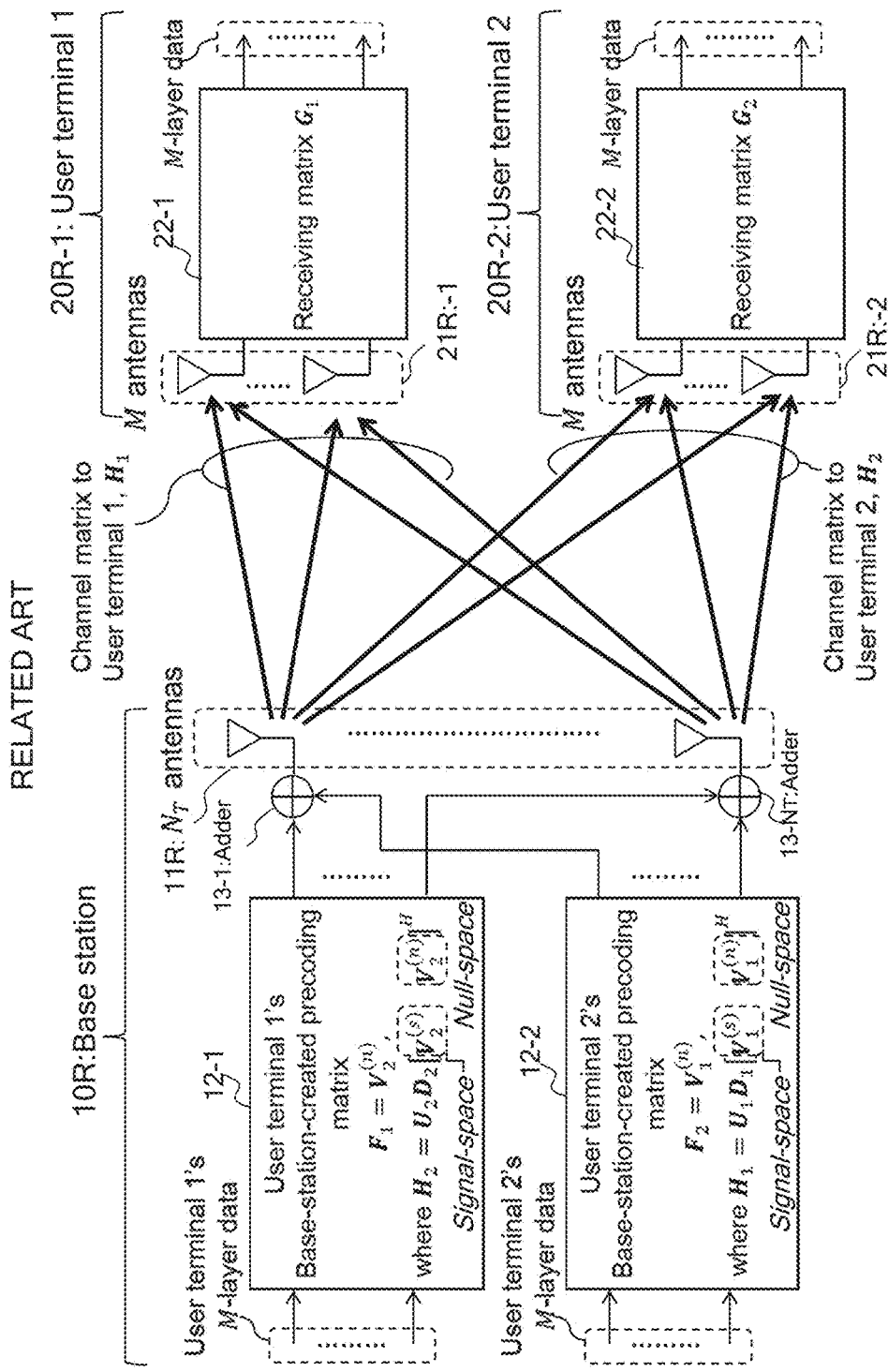
FIG. 2 is a diagram illustrating a base station creating a precoding matrix for each user terminal for MU-MIMO operation in a related art.

Base-station-created precoding matrix Generator (105) obtains the estimated downlink channel matrix from the Channel reciprocity-based downlink channel matrix Estimator (104) and creates a Base-station-created precoding matrix for each user terminal 20. The creation process of the Base-station-created precoding matrix is similar to that in the related art described with reference to FIG. 2.

The Base-station-created precoding matrix is then applied to modulated data to be transmitted to the user terminal. The modulated data is obtained by coding (by a coder not shown) and modulating (by a modulator not shown) each layer of multiple-layer data stored in Data Buffer (107) with MCS selected by MCS Selector (106).

The modulated data having the precoding matrix applied thereto is mapped to Base station antennas (101) and transmitted through Downlink RS/CSI report request/Data Multiplexer (108) to the user terminal (20).

Downlink RS/CSI report request/Data Multiplexer (108) is also in charge of multiplexing transmissions of Downlink RS generated from Downlink RS Generator (109) and CSI report request generated from CSI report request Generator (110) besides transmission of modulated data having the precoding matrix applied thereto.

The Downlink RS is necessary for the user terminal (20) in estimating downlink channel matrix for later creating CSI report. The CSI report request is necessary for the user terminal (20) in creating the CSI report according to an instruction from the base station (10).

When the CSI report and Interference pluses Noise covariance matrix relationship Creator (111) receives the CSI report supplied from the Uplink RS/CSI report Demultiplexer (103), a process to provide MCS Selector (106) with necessary information for selecting appropriate MCS for each data layer of the user terminal (20) is started.

More specifically, the CSI report and Interference pluses Noise covariance matrix relationship Creator (111) takes into account the CSI report request corresponding to the received CSI report, and creates a relationship between the received CSI report and a still-unknown Interference pluses Noise covariance matrix. The Interference pluses Noise covariance matrix $R_{I+N}$ reflects an amount of interference and noise observed at the user terminal's antennas.

Then, Interference pluses Noise covariance matrix Determiner (112) uses the created relationship to determine a value of Interference pluses Noise covariance matrix.

After that, SINR conditioned on Base-station-created precoding matrix Estimator (113) uses the determined value of the Interference pluses Noise covariance matrix from the Interference pluses Noise covariance matrix Determiner (112) and the Base-station-created precoding matrix created by the Base-station-created precoding matrix Generator (105) to estimate SINR for each data layer observed at the user terminal (20).

Finally, MCS Selector (106) receives the estimated SINR for each data layer conditioned on the Base-station-created precoding matrix from the SINR conditioned on Base-station-created precoding matrix Estimator (113), and uses the estimated SINR to select the highest MCS for each data layer that satisfies a predefined data transmission error rate. The selection can be done, for example, by using the SINR-MCS mapping table similar to the table of the related art described with reference to FIG. 3.

Figure 7:
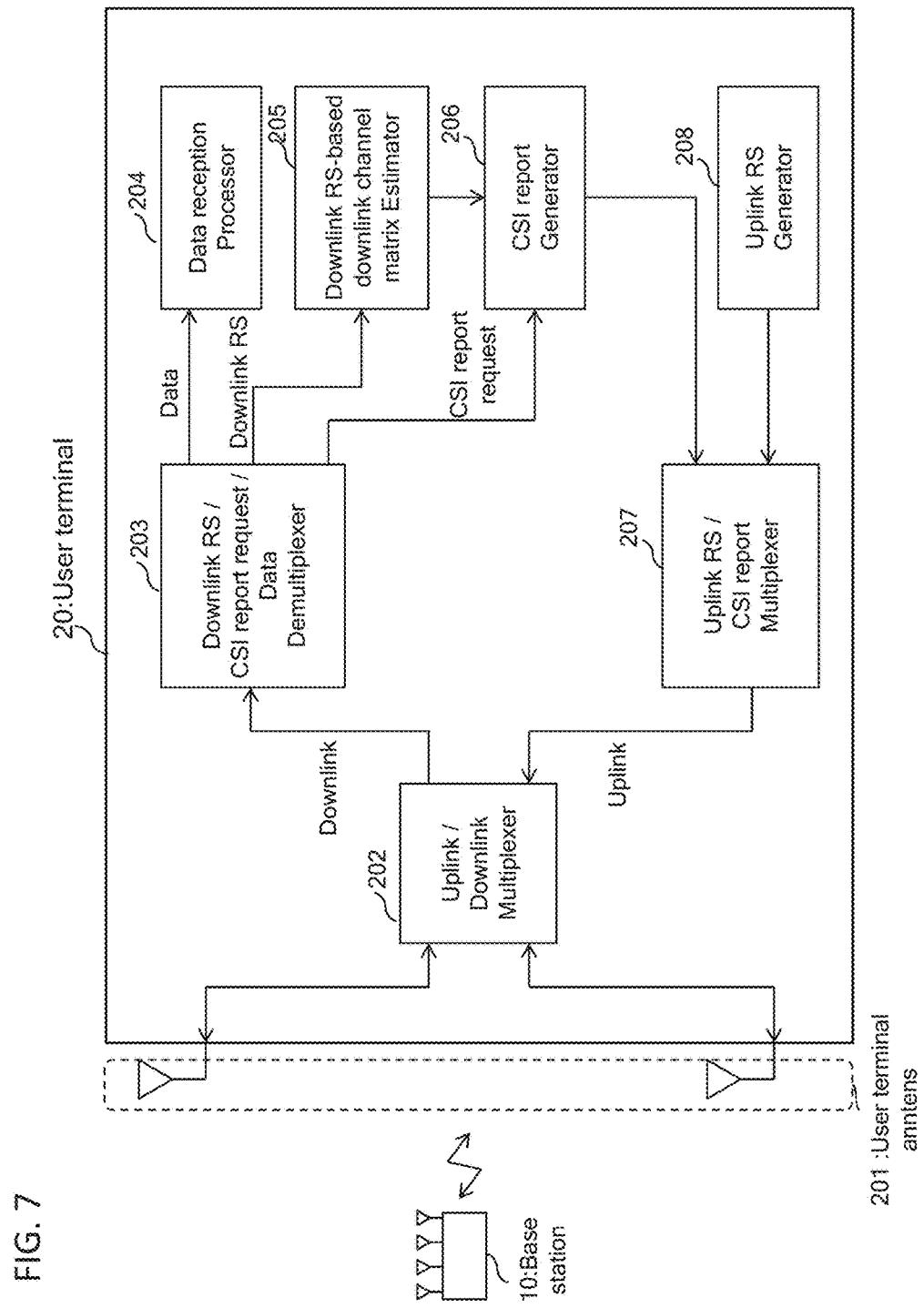
FIG. 7 is a diagram illustrating a user terminal used in common for all exemplary embodiments of the present invention.

FIG. 7 illustrates an example of an arrangement of the user terminal (20). Referring to FIG. 7, a plurality of user terminal antennas (201) are used for both receiving downlink signals and transmitting uplink signals from and to the base station (10), respectively.

Uplink/Downlink Multiplexer (202) multiplexes reception of Downlink signals and transmission of Uplink signals in time.

Downlink RS/CSI report request/Data Demultiplexer (203) demultiplexes the received Downlink signals to Downlink RS, CSI report request, and Data.

Uplink RS/CSI report Multiplexer (207) multiplexes Uplink RS generated by Uplink RS generator (208), and CSI report by Uplink RS/CSI report generator (206) to Uplink signals.

Data reception Processor (204), upon reception of the modulated data having the Base-station-created precoding matrix applied thereto and transmitted from the base station (10), performs data reception processes that include demodulation and decoding.

Downlink RS-based downlink channel matrix Estimator (205), upon reception of the Downlink RS transmitted from the base station (10), estimates downlink channel matrix from the base station (10) to the user terminal (20), itself.

CSI report Generator (206) obtains the estimated downlink channel matrix and the CSI report request transmitted by the base station (10).

Then, CSI report Generator (206) creates CSI report according to an instruction in the received CSI report request. The process for creating CSI report is similar to that in the related art described with reference to FIG. 4.

Specifically, the CSI report created by the CSI report Generator (206) contains information on a User-created precoding matrix, and information on SINR for each data layer conditioned on the User-created precoding matrix.

The created CSI report is then transmitted to the base station (10) through Uplink RS/CSI report Multiplexer (207).

Uplink RS Generator (208) generates Uplink RS to be transmitted to the base station (10) through Uplink RS/CSI report Multiplexer (207). The Uplink RS is necessary for the base station (10) in estimating downlink channel matrix by exploiting uplink-downlink channel reciprocity property for later creating Base-station-created precoding matrix.

In the following, based on the system and devices described with reference to FIGS. 5 to 7, details specific to two exemplary embodiments of the present invention will be described in respective order. Moreover, for clarity of explanation, it is assumed hereinafter that the base station (10) has 4 antennas and the user terminal (20) has 2 antennas, though not limited thereto. In the base station (10), each codeword is mapped to 2 layers (2-layer data).

First Exemplary Embodiment

A summary and then details of a first exemplary embodiment will be described below. In summary, a method provided by the first exemplary embodiment comprises the following steps.

The base station (10) receives CSI report from a user terminal (20).

The base station (10) then creates a relationship between the received CSI report and a still-unknown Interference pluses Noise covariance matrix that reflects an amount of interference and noise observed at the user terminal's antennas.

The base station (10) then determines a value of the Interference pluses Noise covariance matrix based on the created relationship with an assumption that the Interference pluses Noise covariance matrix is a diagonal matrix. Such assumption is valid in most mobile communication system that has the user terminal's antenna spacing larger than half-wavelength of an operational frequency.

After that, the base station (10) uses the determined Interference pluses Noise covariance matrix to estimate the SINR for each data layer conditioned on the Base-station-created precoding matrix.

Finally, the base station (10) selects MCS for each data layer based on the estimated SINR.

Figure 8:
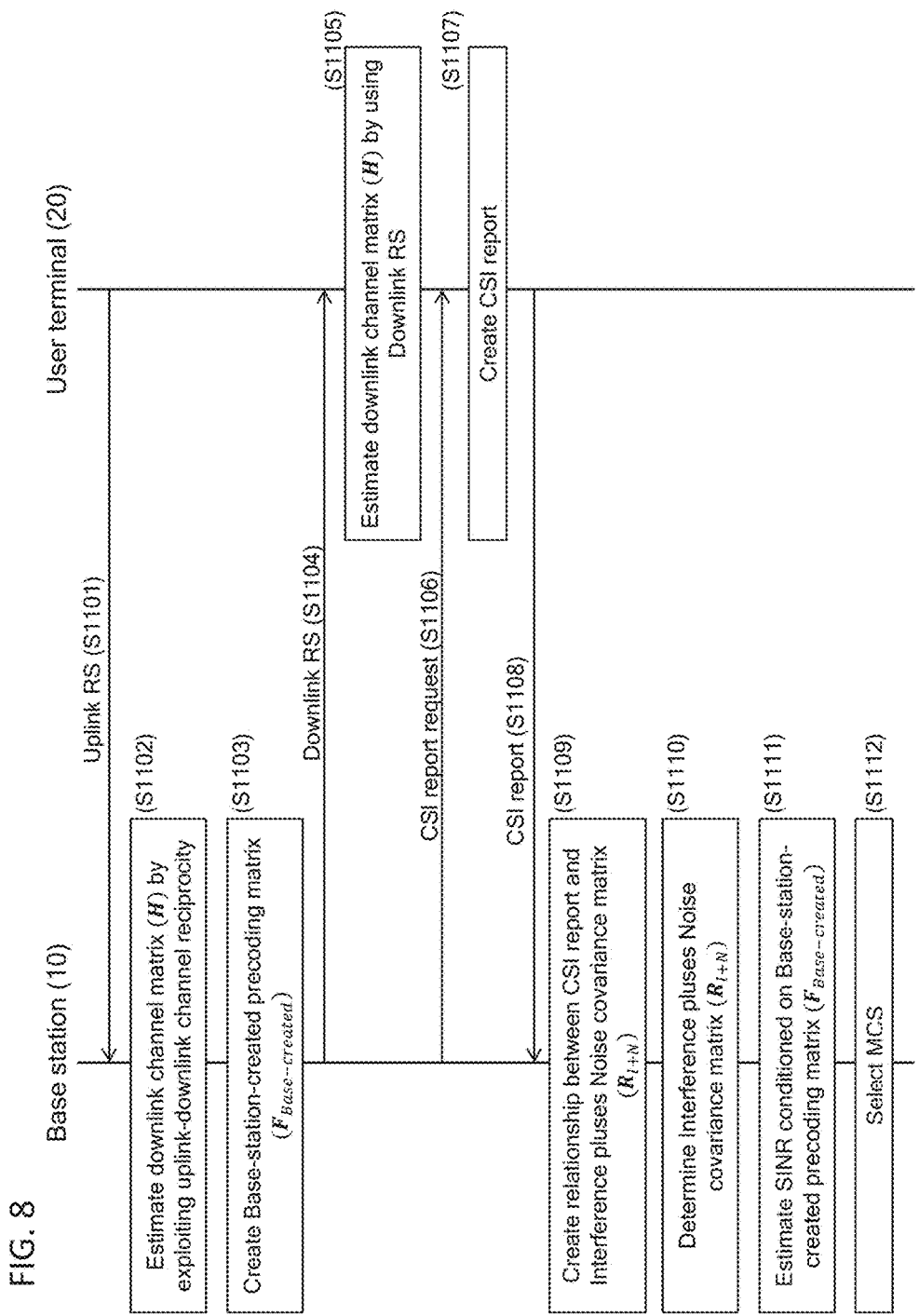
FIG. 8 is a diagram illustrating an example of operations of the overall system according to the first exemplary embodiment.
Figure 9:
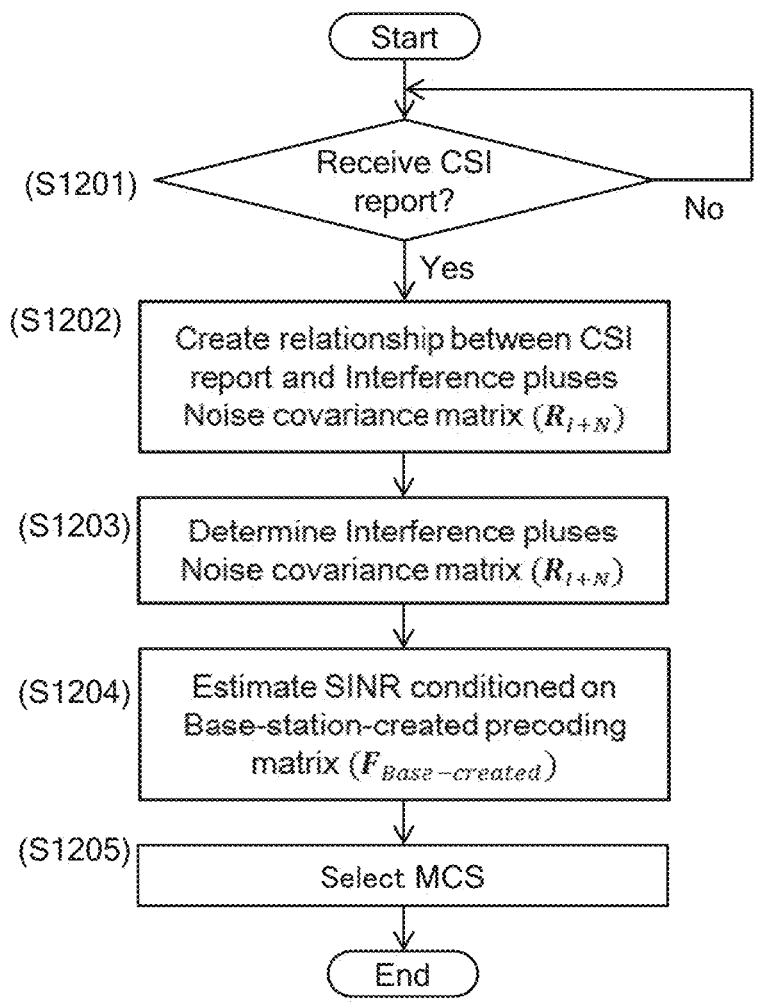
FIG. 9 is a flow chart illustrating an example of operations of a base station according to a first exemplary embodiment.

The following describes details of the first exemplary embodiment with reference to FIGS. 8 and 9.

<System Operations>

FIG. 8 illustrates operations for the overall system comprising both the base station (10) and the user terminal (20).

Referring to FIG. 8, at a beginning, the user terminal (20) transmits Uplink RS to the base station (10) (operation S1101).

The base station (10) uses the Uplink RS to estimate a 2×4 downlink channel matrix (H) by exploiting uplink-downlink channel reciprocity (operation S1102). Note that operation S1101 and S1102 are similar to those in the related art described with reference to FIG. 1.

Next, the base station (10) creates a 4×2 Base-station-created precoding matrix ($F_{Base-created}$) (operation S1103). The base station (10) can use a method to create the Base-station-created precoding matrix, similar to that in the related art described with reference to in FIG. 2.

In order to obtain the CSI report from the user terminal (20), the base station (10) first transmits Downlink RS to the user terminal (20) (operation S1104).

The user terminal (20) then estimates downlink channel matrix by using the Downlink RS (operation S1105).

Then, the base station (10) transmits CSI report request to the user terminal (20) (operation S1106).

Finally, the user terminal (20) creates CSI report (operation S1107) and transmits the CSI report to the base station (10) (operation S1108). The process of requesting and reporting the CSI report from operation S1104 to S1108 can use the processes in the related art described with reference to FIG. 4.

Therefore, the base station (10) receives the CSI report that comprises two information items, namely:
(i) 4×2 User-created precoding matrix; and
(ii) SINR for each data layer conditioned on the User-created precoding matrix.

For the sake of simplicity, the 4×2 User-created precoding matrix is hereinafter denoted by $F_{User-created}$ and the SINR for each data layer conditioned on the User-created precoding matrix by $\gamma_{User-created}(m)$, where m denotes a data layer index and $m \in \{1,2\}$.

On reception of the CSI report from the user terminal (20), the base station (10) creates a relationship between the received CSI report and the still-unknown 2×2 Interference pluses Noise covariance matrix ($R_{I+N}$) that reflects an amount of interference and noise observed at the user terminal's antennas (operation S1109).

Then, the base station (10) determines a value of the Interference pluses Noise covariance matrix ($R_{I+N}$) based on the created relationship (operation S1110).

After that, the base station (10) uses the determined Interference pluses Noise covariance matrix ($R_{I+N}$) to estimate a new SINR per each data layer that is conditioned on the Base-station-created precoding matrix ($F_{Base-created}$) (operation S1111).

More specific details of operation S1109 to S1111 will be explained in later section that describes the base station operation.

Moreover, for the sake of simplicity, the new SINR per each data layer that is conditioned on the Base-station-created precoding matrix ($F_{Base-created}$) is hereinafter denoted by $\gamma_{Base-created}(m)$, where m denotes a data layer index and $m \in \{1,2\}$.

After the base station (10) has obtained the estimate of SINR per each data layer conditioned on the Base-station-created precoding matrix ($\gamma_{Base-created}(m)$), the base station (10) can select an appropriate MCS for each data layer (operation S1112). The selection of MCS can be based on the MCS-SINR mapping table similar to the one used in the related art described with reference to FIG. 3.

<Base Station Operations>

FIG. 9 is a flow chart illustrating operations of the base station (10). For the sake of simplicity of the explanation, it is assumed that the base station (10) has already created the Base-station-created precoding matrix, and has already requested for the CSI report. Therefore, referring to FIG. 9, in the first operation S1201, the base station (10) is regularly checking whether the CSI report has been received.

Upon reception of the CSI report, the base station (10) creates the relationship between the received CSI report and a still-unknown 2×2 Interference pluses Noise covariance matrix ($R_{I+N}$) (operation S1202).

The base station (10) creates the relationship between the received CSI report and the Interference pluses Noise covariance matrix ($R_{I+N}$) by expressing the received SINR for each data layer conditioned on the User-created precoding matrix ($\gamma_{User-created}(m)$) in terms of the received User-created precoding matrix ($F_{User-created}$) and Interference pluses Noise covariance matrix ($R_{I+N}$). Such relationship can be expressed mathematically as shown below.

$$\gamma_{User-created}(m) = \frac{P_S\left[(G_U^H HF_{User-created})(G_U^H HF_{User-created})^H\right]_{(m,m)}}{[G_U^H R_{I+N} G_U]_{(m,m)}}, \quad \text{(Eq. 1)}$$

for $m \in \{1, 2\}$ where $P_S$ is Average transmit power per data layer, which is already known by the base station (10) as a relative power with respect to Downlink RS transmit power.

$G_U$ is a 2×2 receiving matrix at the user terminal based on the User-created precoding matrix, which can be assumed by the base station in the absence of such information from the user terminal. For example when it is assumed that ZF (zero-forcing) receiver is used, $G_U$ is given as follows:

$$G_U = [)HF_{User-created})_H(HF_{User-created})]^{-1}(HF_{User-created})^H \quad \text{(Eq. 2)}$$

In Eq. 1, $[X]_{(a,b)}$ indicates (a, b) element of matrix X.

Note: Assuming that a received vector y(k) observed at the user terminal k is modeled as y(k)=HFs(k)+v(k), where H is a channel matrix from a base station to the user terminal k, F is a precoding matrix, s(k) is a symbol vector, and v(k) is a noise vector (interference pluses noise vector), the Eq. 1 is based on the following well known formula:

$$SINR = \frac{|G^H HF|^2}{G^H R_{I+N} G},$$

where G is a receiving matrix, $R_{I+N}$ is an Interference pluses Noise covariance matrix: $R_{I+N}=E\{v(k)v(k))^H\}$, and a symbol power $E\{s^2(k)\}$ is normalized to $E\{s^2(k)\}=1$, where $E\{.\}$ indicates expectation.

After the relationship between the received CSI report and the 2×2 Interference pluses Noise covariance matrix ($R_{I+N}$) is created, the base station (10) determines the value of Interference pluses Noise covariance matrix ($R_{I+N}$) (operation S1203).

Specifically, the received values of SINR for each data layer conditioned on the User-created precoding matrix ($\gamma_{User-created}(m)$) and the received value of User-created precoding matrix ($F_{User-created}$) are substituted in (Eq. 1) to form a system of 2 equations having the same unknown 2×2 Interference pluses Noise covariance matrix ($R_{I+N}$).

Then, the base station (10) assumes that the Interference pluses Noise covariance matrix is a diagonal matrix $$R_{I+N}=\text{diag}\{R_1,R_2\}, \quad \text{(Eq. 3)}$$

and then solves the system of equations for their diagonal element values. Such assumption is valid in most mobile communication system that has the user terminal's antenna spacing larger than half-wavelength of the operational frequency.

The values of $R_1$ and $R_2$ under the assumption that the user terminal using the ZF receiver are shown below.

$$R_1 = P_S\left[\frac{|G_{U,22}|^2}{|G_{U,21}|^2} \cdot \frac{1}{\gamma_{User-created}(1)} - \frac{1}{\gamma_{User-created}(2)}\right] \bigg/ \left[\frac{|G_{U,11}|^2|G_{U,22}|^2}{|G_{U,21}|^2} - |G_{U,12}|^2\right] \quad \text{(Eq. 4a)}$$

$$R_2 = P_S\left[\frac{1}{\gamma_{User-created}(2)} - \frac{|G_{U,12}|^2}{|G_{U,11}|^2} \cdot \frac{1}{\gamma_{User-created}(1)}\right] \bigg/ \left[|G_{U,22}|^2 - \frac{|G_{U,12}|^2|G_{U,21}|^2}{|G_{U,11}|^2}\right] \quad \text{(Eq. 4b)}$$

where $G_{U,ab}$ indicates (a, b) element of matrix $G_U$.

Note: The outline of the derivation of $R_1$ and $R_2$ is as follows. Assuming that $G_U$ is the ZF receiver, a matrix: $(G_U^H HF_{User-created})$ in the numerator in the (Eq. 1) is a 2×2 identity matrix I, and the matrix enclosed in the parentheses in the numerator in the (Eq. 1) becomes $P_S I$. The diagonal elements ((1,1) and (2,2) elements) of a matrix: $G_U^H R_{I+N} G_U$ in the denominator in the (Eq. 1) are respectively given as: $G_{11}R_1G_{11}+G_{21}R_2G_{21}$, and $G_{12}R_1G_{12}+G_{22}R_2G_{22}$. Thus, (Eq. 1) is rewritten to the following simultaneous linear equations with two unknowns ($R_1$, $R_2$):

$$G_{11}^2 R_1 + G_{21}^2 R_2 = \frac{P_s}{\gamma_{User-created}(1)}$$

$$G_{12}^2 R_1 + G_{22}^2 R_2 = \frac{P_s}{\gamma_{User-created}(2)}$$

Solving the above equations, $R_1$ and $R_2$ are given as the (Eq. 4a) and (Eq. 4b), respectively.

Once the value of Interference pluses Noise matrix ($R_{I+N}$) is determined, the base station (10) uses that value to estimate the new SINR for each data layer that is conditioned on the Base-station-created precoding matrix (operation S1204).

The estimation is performed by modifying (Eq. 1) to take into account the Base-station-created precoding matrix ($F_{Base-created}$) instead of the User-created precoding matrix ($F_{User-created}$), and substituting in the value of the determined Interference pluses Noise covariance matrix. The mathematical expression of the new SINR for each data layer conditioned on the Base-station-created precoding matrix can be given below.

$$\gamma_{Base-created}(m) = \frac{P_S \left[ (G_B^H HF_{Base-created})(G_B^H HF_{Base-created})^H \right]_{(m,m)}}{[G_B^H R_{I+N} G_B]_{(m,m)}}, \quad \text{(Eq. 5)}$$

for $m \in \{1, 2\}$ where $G_B$ is a 2×2 receiving matrix at the user terminal based on the Base-station-created precoding matrix, which can be assumed by the base station in the absence of such information from the user terminal. For example when it is assumed that ZF receiver is used, $G_B$ is given below:

$$G_B = [(HF_{Base-created})^H (HF_{Bsse-created})]^{-1} (HF_{Base-created})^H, \quad \text{(Eq. 6)}$$

Finally, the base station (10) uses the estimated SINR conditioned on the Base-station-created precoding matrix ($\gamma_{Base-created}(m)$) to select MCS (operation S1205).

The selection of MCS can be based on the MCS-SINR mapping table similar to the one used in the related art described with reference to FIG. 3.

<User Terminal Operations>

Figure 4:
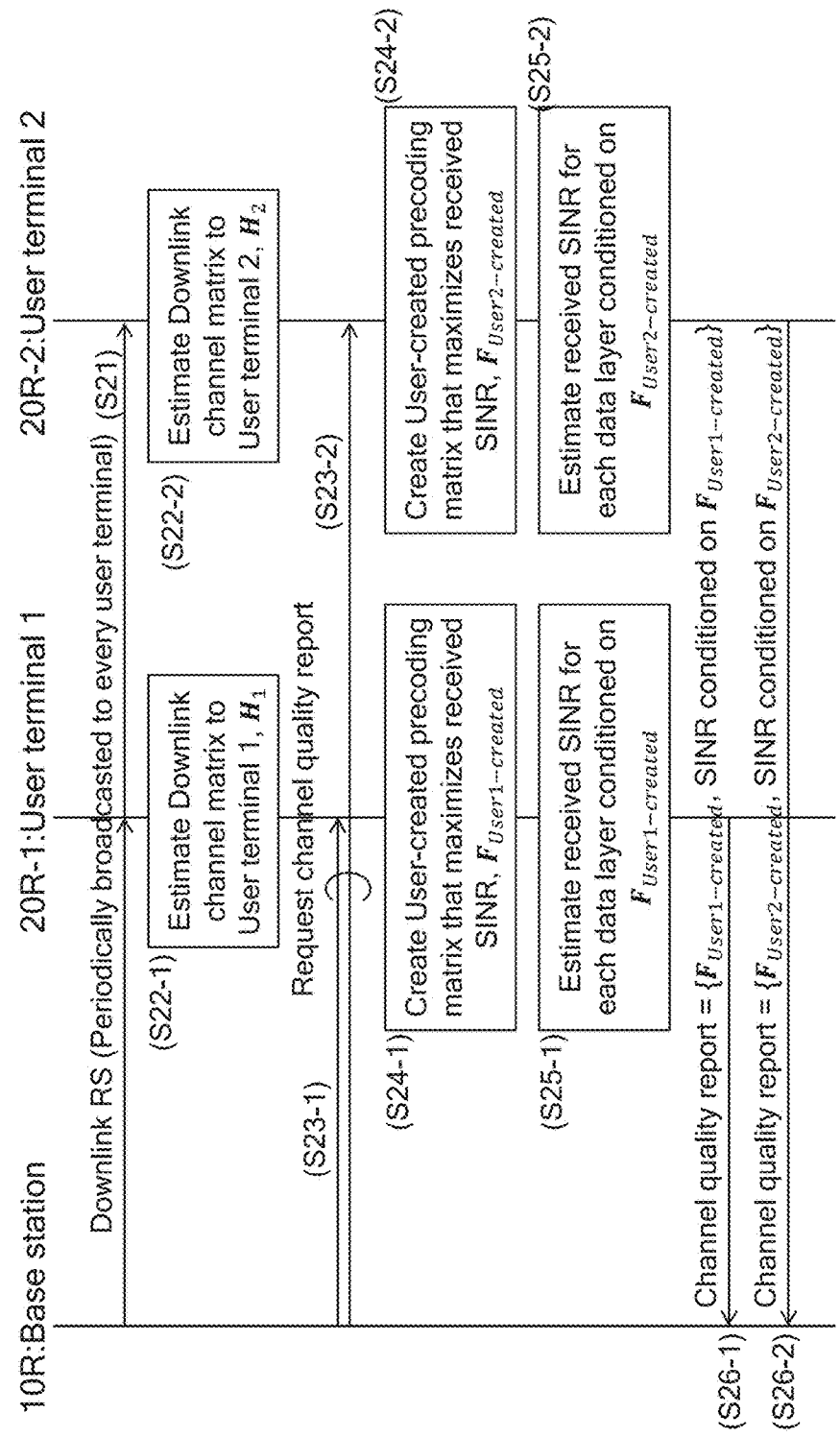
FIG. 4 is a sequence diagram illustrating operations of user terminals creating a channel quality report in a related art.

Operations of the user terminal (20) in the first exemplary embodiment are similar to the operations in the related art described with reference to FIG. 4. Therefore, their drawings and detailed explanations are omitted.

Advantageous Effects

According to the above described first exemplary embodiment, the information of SINR for each data layer conditioned on the Base-station-created precoding matrix can be made available at the base station in most of mobile communication system that has the user terminal's antenna spacing larger than half-wavelength of the operational frequency. Therefore, the base station can further use that information to select appropriate MCS for the Base-station-created precoding matrix and to maximize both user terminal's throughput and network capacity.

Second Exemplary Embodiment

The second exemplary embodiment makes modification to the first exemplary embodiment by adding 2 major operations.

The first operation includes the base station creating and transmitting to the user terminal composite CSI reports request that specifies different version of Interference pluses Noise covariance matrix for each composite CSI report. The different version of Interference pluses Noise covariance matrix indicates different elements in the Interference pluses Noise covariance matrix that are of interest to the base station.

The second operation includes the user terminal receiving the composite CSI reports request, creating and transmitting composite CSI reports to the base station according to the composite CSI reports request. The user terminal creates each of composite CSI reports by using different version of Interference pluses Noise covariance matrix specified by the base station.

With the first and second operations, the base station in the second exemplary embodiment exemplary embodiment can determine values of multiple versions of Interference pluses Noise covariance matrix, and combine them into one representative Interference pluses Noise covariance matrix.

The representative Interference pluses Noise covariance matrix would then be a general matrix rather than a diagonal matrix as in the first exemplary embodiment. The representative Interference pluses Noise covariance matrix is therefore valid for any mobile communication system and not limited to the one that has the user terminal's antenna spacing larger than half-wavelength of the operational frequency. Using this representative matrix, the base station can estimate the SINR conditioned on the Base-station-created precoding matrix and later select appropriate MCS.

Figure 10:
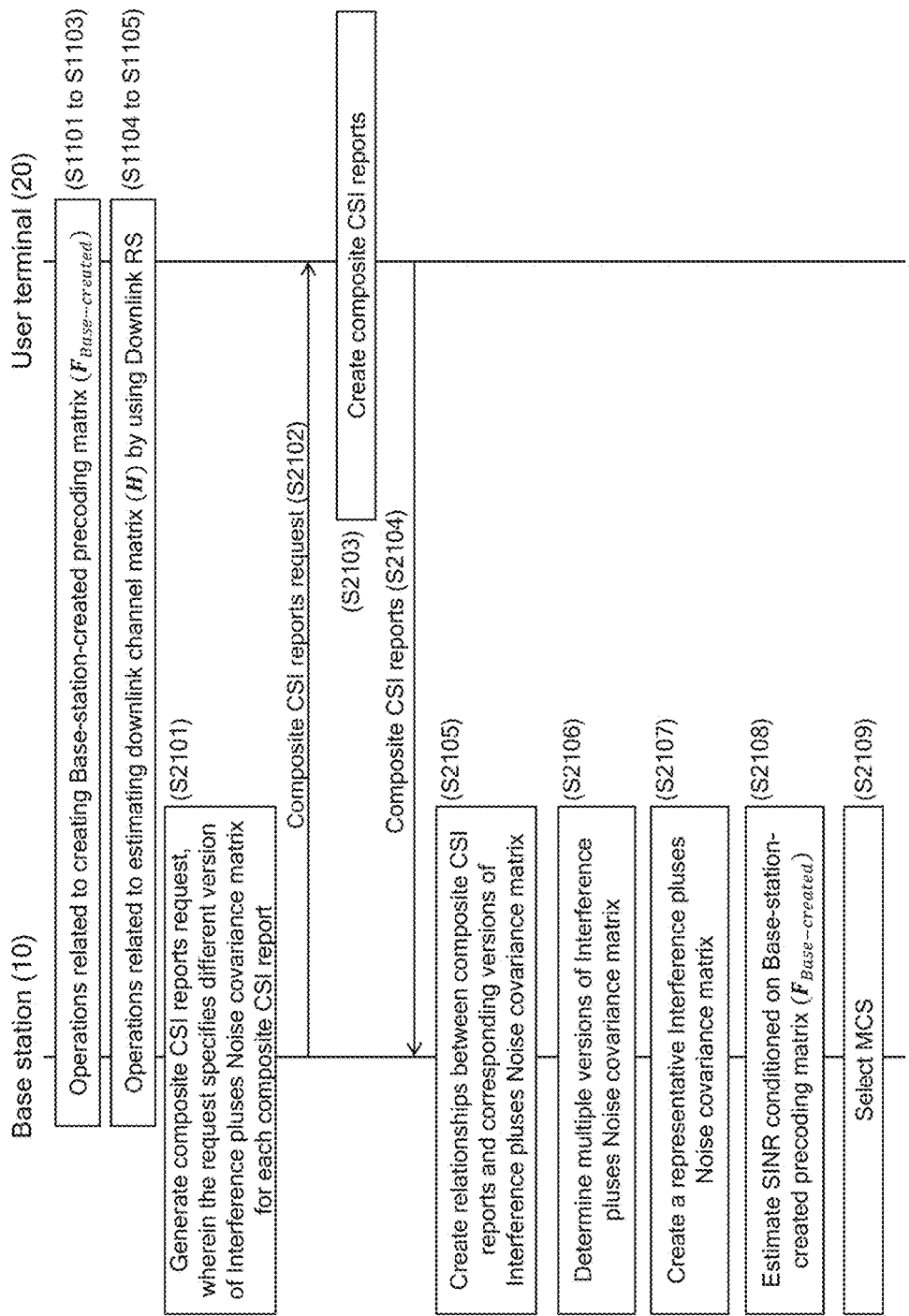
FIG. 10 is a diagram illustrating operations of the overall system according to a second exemplary embodiment.
Figure 11:
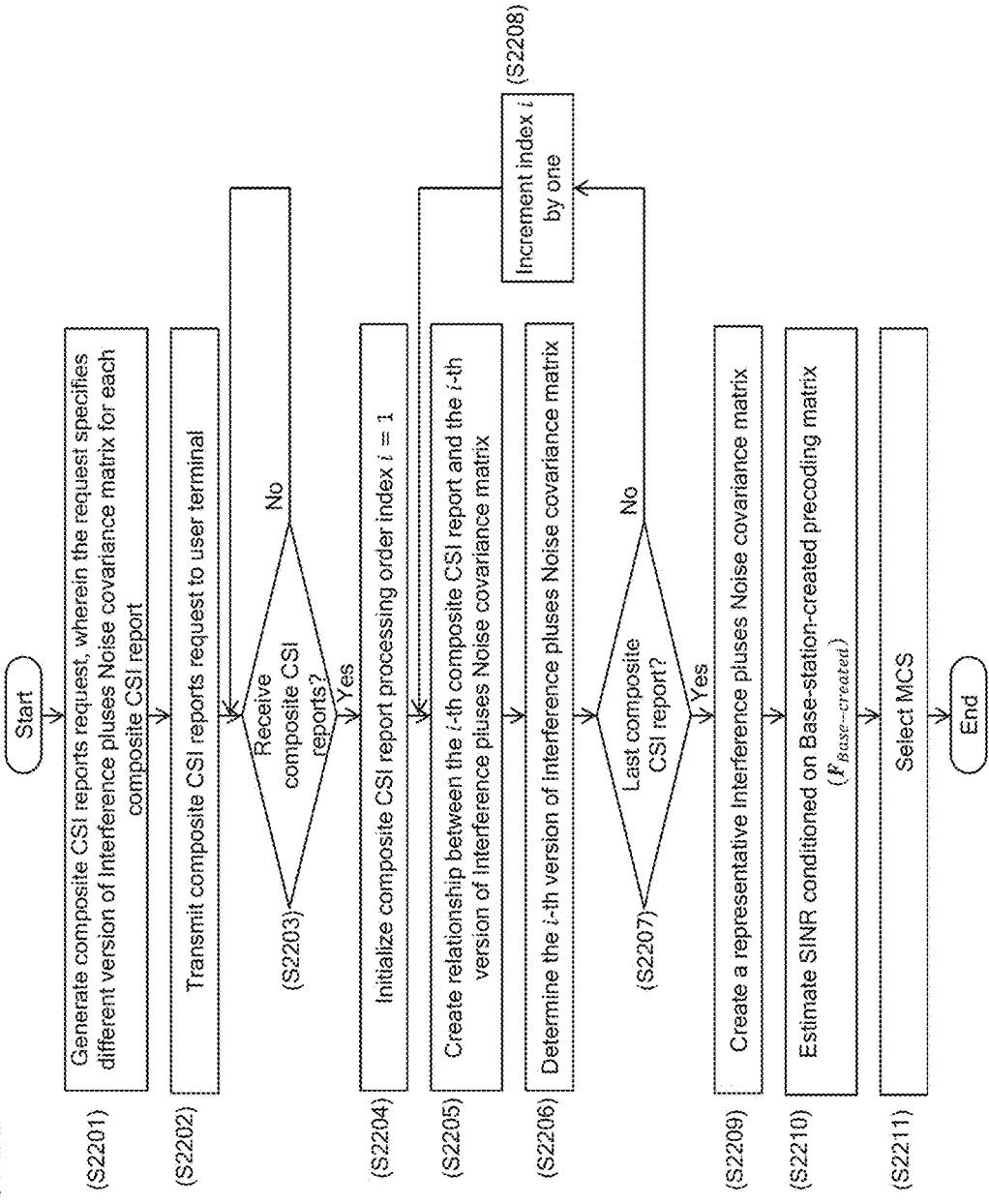
FIG. 11 is a flow chart illustrating operations of a base station according to the second exemplary embodiment.
Figure 12:
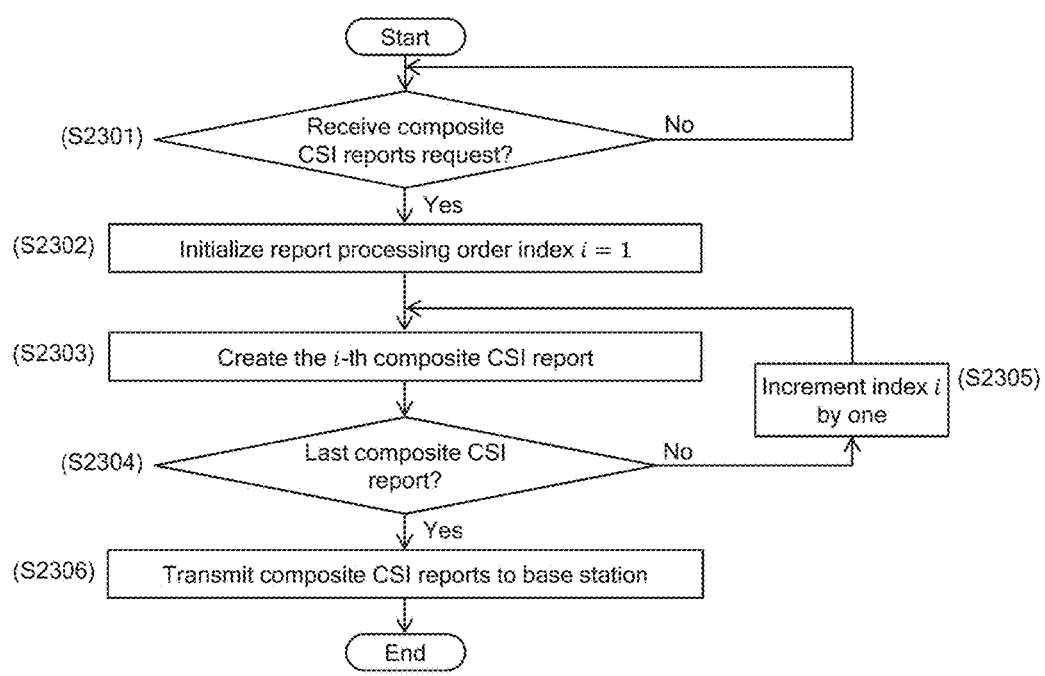
FIG. 12 is a flow chart illustrating operations of a user terminal according to the second exemplary embodiment.

The following describes details of the second exemplary embodiment with reference to FIGS. 10 to 12.

<System Operations>

Figure 1:
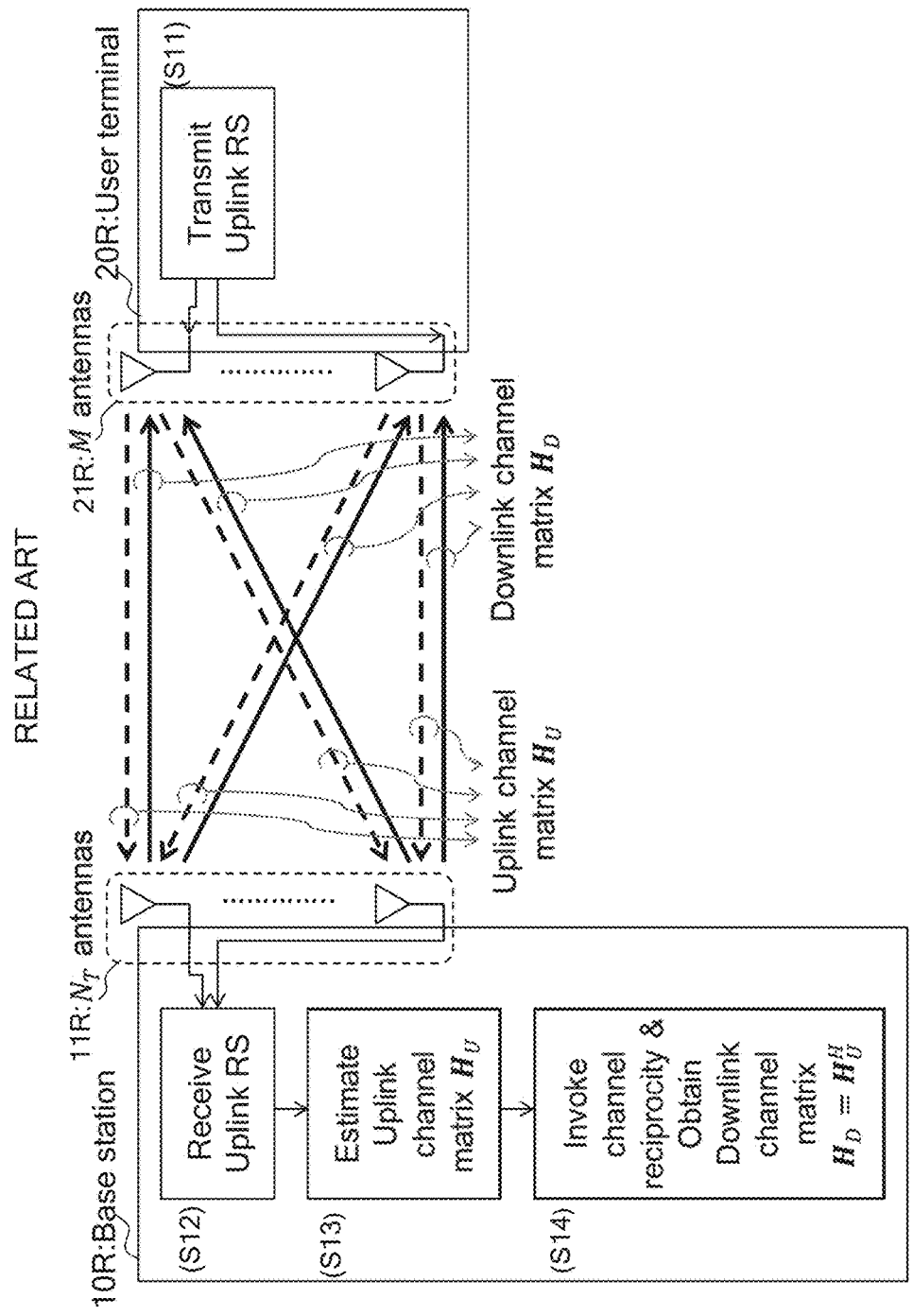
FIG. 1 is a diagram illustrating a base station estimating downlink channel matrix by exploiting uplink-downlink channel reciprocity property in a related art.

FIG. 10 is a sequence chart illustrating operations for the overall system according to the second exemplary embodiment which comprises both the base station (10) and the user terminal (20) as illustrated in FIG. 1.

Referring to FIG. 10, at a beginning, the base station creates the 4×2 Base-station-created precoding matrix ($F_{Base-created}$) and the user terminal estimates the 2×4 downlink channel matrix (H) by using the Downlink RS, similar to operations S1101 to S1105 (FIG. 8) according to the first exemplary embodiment.

The base station (10) then generates composite CSI reports request, wherein the request specifies different version of 2×2 Interference pluses Noise covariance matrix for each composite CSI report (operation S2101).

The different version of Interference pluses Noise covariance matrix indicates different elements in the Interference pluses Noise covariance matrix that are of interest to the base station. The base station (10) then transmits the composite CSI reports request to the user terminal (20) (operation S2102). More specific details of operation S2101 will be explained in later section that describes the base station operation.

Once the user terminal (20) receives the composite CSI reports request, the user terminal (20) creates composite CSI reports according to the request (operation S2103). The user terminal (20) creates each of composite CSI reports by using different version of Interference pluses Noise covariance matrix specified by the base station (10). The results are a User-created precoding matrix and corresponding SINR for each of composite CSI reports.

Then, the user terminal (20) transmits the composite CSI reports to the base station (10) (operation S2104). More specific details of operation S2103 will be explained later in section that describes the user terminal operation.

The base station (10), after receiving the composite CSI reports, creates relationships between the received composite CSI reports and the corresponding versions of Interference pluses Noise covariance matrix (operation S2105).

Then, the base station (10) determines the values of multiple versions of Interference pluses Noise covariance matrix based on the created relationships (operation S2106).

The base station (10), using the determined multiple versions of Interference pluses Noise covariance matrix, creates the representative Interference pluses Noise covariance matrix (operation S2107).

After that, the base station (10) estimates the SINR for each data layer conditioned on the Base-station-created precoding matrix by using the created representative Interference pluses Noise covariance matrix (operation S2108).

Finally, the base station (10) selects MCS based on the estimated SINR (operation S2109). More specific details of operation S2105 to S2109 will be explained later in section that describes the base station operation.

<Base Station Operations>

FIG. 11 is a flow chart illustrating operations of the base station (10). Here, it is assumed that the base station (10) has already created the Base-station-created precoding matrix ($F_{Base-created}$). Therefore, in the first operation S2201 in FIG. 11, the base station (10) generates composite CSI reports request, wherein the request specifies different version of 2×2 Interference pluses Noise covariance matrix for each composite CSI report. The different version of Interference pluses Noise covariance matrix indicates different elements in the Interference pluses Noise covariance matrix that are of interest to the base station (10).

For clarity of explanation, the following describes an example of the base station (10) creating the request for two composite CSI reports.

The request specifies two Interference pluses Noise covariance matrices denoted by $R_{I+N}^{(1)}$ and $R_{I+N}^{(2)}$ for use in the creation of the first and second composite CSI reports, respectively. $R_{I+N}^{(1)}$ and $R_{I+N}^{(2)}$ are defined as shown below.

$$R_{I+N}^{(1)} = \begin{bmatrix} R_{11} & 0 \\ 0 & R_{22} \end{bmatrix} \quad \text{(Eq. 7a)}$$

$$R_{I+N}^{(2)} = \begin{bmatrix} 0 & R_{12} \\ R_{21} & 0 \end{bmatrix} \quad \text{(Eq. 7b)}$$

Next, the base station (10) transmits the request for 2 composite CSI reports to the user terminal (20) (operation S2202).

After that, the base station (10) regularly checks whether the 2 composite CSI reports have been received (operation S2203).

Here, it is assumed that the 2 composite CSI reports from the user terminal comprise 2 sets of 4×2 User-created precoding matrix and SINR for each data layer conditioned on the User-created precoding matrix. Specifically, the first set of User-created precoding matrix and corresponding SINR are denoted as $F_{User-created}^{(1)}$ and $\gamma_{User-created}(m)$, respectively, where m indicates a data layer index and $m \in \{1,2\}$.

On the other hand, the second set of User-created precoding matrix and corresponding SINK are denoted by $F_{User-created}^{(2)}$ and, respectively.

More specific details of how $F_{User-created}^{(1)}$, $F_{User-created}^{(2)}$, $\gamma_{User-created}(m)^{(1)}$ and $\gamma_{User-created}(m)^{(2)}$ are created will be explained later in section that describes the user terminal operation. However, it is noted here that $F_{User-created}^{(1)}$ and $\gamma_{User-created}(m)^{(1)}$ are created based on $R_{I+N}^{(1)}$ and $F_{User-created}^{(2)}$ and $\gamma_{User-created}(m)^{(2)}$ are created based on $R_{I+N}^{(2)}$.

After the base station (10) receives the 2 composite CSI reports from the user terminal (20), the base station (10) initializes composite CSI report processing order index i=1 (operation S2204).

Then, the base station (10) creates a relationship between the first composite CSI report and the first Interference pluses Noise covariance matrix $R_{I+N}^{(1)}$ (operation S2205). This is done by modifying (Eq. 1) to take into account $F_{User-created}^{(1)}$, $\gamma_{User-created}(m)^{(1)}$, and $R_{I+N}^{(1)}$. The resulting mathematical expression is shown below.

$$\gamma_{User-created}^{(1)}(m) = \frac{P_S[(G_U^{(1)H} HF_{User-created}^{(1)})(G_U^{(1)H} HF_{User-created}^{(1)})^H]_{(m,m)}}{[G_U^{(1)H} R_{I+N}^{(1)} G_U^{(1)}]_{(m,m)}}, \quad \text{(Eq. 8)}$$

$$\text{for } m \in \{1, 2\}$$

where $G_U^{(1)}$ is a 2×2 receiving matrix at the user terminal based on the User-created precoding matrix $F_{User-created}^{(1)}$, which can be assumed by the base station in the absence of such information from the user terminal. When it is assumed that ZF receiver is used, $G_U^{(1)}$ is given as follows:

$$G_U^{(1)} = [(HF_{User-created})^H (HF_{User-created})]^{-1} (HF_{User-created})^H \quad \text{(Eq. 9)}$$

Then, based on (Eq. 8), the base station (10) determines the values of the first Interference pluses Noise covariance matrix $R_{I+N}^{(1)}$ (operation S2206). Since a method for the determination is well known to those skilled in the arts, their details are omitted for conciseness.

Next, the base station (10) checks whether all of 2 composite CSI reports have been processed (operation S2207).

If there is remaining composite CSI report left to be processed, the processing order index i is incremented by one (operation S2208) and operation S2205 and S2206 are repeated. In this case, this implies the operations are repeated on the second composite CSI report, which would create a relationship between $F_{User-created}^{(2)}$, $\gamma_{User-created}(m)^{(2)}$, and $R_{I+N}^{(2)}$, and eventually determine the value of $R_{I+N}^{(2)}$. Since the creation of such relationship and the determination of $R_{I+N}^{(2)}$ are similar to the operations on the first composite CSI report described previously, their details are omitted for conciseness.

Once all of 2 composite CSI reports have been processed, the base station (10) creates the representative Interference pluses Noise covariance matrix from the first and second matrices $R_{I+N}^{(1)}$ and $R_{I+N}^{(2)}$, respectively (operation S2209).

The representative Interference pluses Noise covariance matrix are denoted as $\overline{R}_{1+N}$. The $\overline{R}_{1+N}$ can be created by the following equation.

$$\overline{R}_{I+N} = R_{I+N}^{(1)} + R_{I+N}^{(2)} \quad \text{(Eq. 10)}$$

It is noted here that the representative Interference pluses Noise covariance matrix $\overline{R}_{I+N}$ is a general matrix rather than a diagonal matrix as in the first exemplary embodiment. This implies that $\overline{R}_{I+N}$ can accurately reflect interference and noise observed at the user terminal's antennas in any mobile communication system, not limited to the one that has the user terminal's antenna spacing larger than half-wavelength of the operational frequency.

After the representative Interference pluses Noise covariance matrix $\overline{R}_{I+N}$ is created, the base station (10) uses it to estimate the SINR conditioned on the Base-station-created precoding matrix ($F_{Base-created}$) (operation S2210).

The estimation is performed by modifying (Eq. 5) to take into account the representative Interference pluses Noise covariance matrix $\overline{R}_{I+N}$. The mathematical expression for the SINR for each data layer denoted by $\gamma_{Base-created}(m)$ is shown below.

$$\gamma_{Base-created}(m) = \frac{P_S\left[(G_B^H HF_{Base-created})(G_B^H HF_{Base-created})^H\right]_{(m,m)}}{[G_B^H \overline{R}_{I+N} G_B]_{(m,m)}}, \quad \text{(Eq. 11)}$$

for $m \in \{1, 2\}$

Finally, the base station (10) uses the estimated SINR conditioned on the Base-station-created precoding matrix ($\gamma_{Base-created}(m)$) to select MCS (operation S2211). The selection of MCS can be based on the MCS-SINR mapping table similar to the one used in the related art described in FIG. 3.

<User Terminal Operations>

FIG. 12 is a flow chart illustrating operations of the user terminal (20). Here, it is assumed that the user terminal (20) has already estimated the downlink channel matrix (H) by using the Downlink RS. Therefore, in the first operation S2301, the user terminal (20) regularly checks whether the request for 2 composite CSI reports have been received.

Upon reception of the request for 2 composite CSI reports from the base station (10), the user terminal (20) initializes the composite CSI report processing order index i=1 (operation S2302).

Then, the user terminal (20) creates the first composite CSI report based on the specified first Interference pluses Noise covariance matrix $R_{I+N}^{(1)}$ (operation S2303).

Specifically, the user terminal (20) first substitutes non-zero elements of $R_{I+N}^{(2)}$ with values of Interference pluses Noise covariance matrix that the user terminal estimates by itself (User-estimated Interference pluses Noise covariance matrix).

The details of deriving the User-estimated Interference pluses Noise covariance matrix are omitted here, since it is well known that the User-estimated Interference pluses Noise covariance matrix can easily be derived at the user terminal (20) by using the downlink channel matrix (H) and the Downlink RS.

Next, the user terminal (20) creates the 4×2 User-created precoding matrix $F_{User-created}^{(1)}$ that maximizes the received SINR calculated by using the first Interference pluses Noise covariance matrix $R_{I+N}^{(1)}$.

The mathematical expression of $F_{User-created}^{(1)}$ in terms of $R_{I+N}^{(1)}$ is given as below.

$$F_{User-created}^{(1)} = \arg\max_{\tilde{F} \in C^{4\times 2}} \left\{ \sum_{m=1}^{2} \log_2 \left( 1 + \frac{P_S\left[(\tilde{G}^H H\tilde{F})(\tilde{G}^H H\tilde{F})^H\right]_{(m,m)}}{[\tilde{G}^H R_{I+N}^{(1)} \tilde{G}]_{(m,m)}} \right) \right\} \quad \text{(Eq. 12)}$$

where $C^{4\times 2}$ is a space of 4×2 matrix with complex number elements, $\tilde{G}$ is a 2×2 receiving matrix at the user terminal based on the User-created precoding matrix $\tilde{F}$. For example when the ZF receiver is used, $\tilde{G}$ is given as below.

$$\tilde{G} = \left[(H\tilde{F})^H (H\tilde{F})\right]^{-1} (H\tilde{F})^H, \quad \text{(Eq. 13)}$$

It is noted here that solution of (Eq. 12) in LTE system typically uses a predefined set of 4×2 matrices denoted as codebook, instead of $C^{4\times 2}$. This reduces the solution to finding the matrix in the codebook that maximizes the expression in (Eq. 12) and using that matrix as $F_{User-created}^{(1)}$.

Next, the SINR for each data layer conditioned on the created User-created precoding matrix $F_{User-created}^{(1)}$ is determined by using again the first Interference pluses Noise covariance matrix $R_{I+N}^{(1)}$. This is equivalent to the following mathematical expression.

$$\gamma_{User-created}^{(1)}(m) = \frac{P_S\left[(\overline{G}_U^{(1)H} HF_{User-created}^{(1)})(\overline{G}_U^{(1)H} HF_{User-created}^{(1)})^H\right]_{(m,m)}}{[\overline{G}_U^{(1)H} R_{I+N}^{(1)} \overline{G}_U^{(1)}]_{(m,m)}}, \quad \text{(Eq. 14)}$$

for $m \in \{1, 2\}$ where $\overline{G}_U^{(1)}$ is a 2×2 receiving matrix at the user terminal based on the User-created precoding matrix $F_{User-created}^{(1)}$. For example, when the ZF receiver is used, $\overline{G}_U^{(1)}$ is given as below.

$$\overline{G}_U^{(1)} = [(HF_{User-Created}^{(1)})^H (HF_{User-Created}^{(1)})]^{-1} (HF_{User-Created}^{(1)})^H, \quad \text{(Eq. 15)}$$

After the first composite CSI report is created, the user terminal (20) checks whether all of 2 composite CSI reports have been created (operation S2304).

If there is remaining composite CSI report left to be processed, the processing order index i is incremented by one (operation S2305) and operation S2303 is repeated.

In this case, this implies the operation is repeated on the second composite CSI report, which would create the User-created precoding matrix $F_{User-created}^{(2)}$ and the corresponding SINK $\gamma_{User-created}^{(2)}(m)$ by using the second Interference pluses Noise covariance matrix $R_{I+N}^{(2)}$. Since such operation is similar to the operation on the first composite CSI report, its detail is omitted for brevity.

Once all 2 composite CSI reports are created, the user terminal (20) transmits them to the base station (10) (operation S2306).

Advantageous Effects

According to the above described second exemplary embodiment, the information of SINR for each data layer conditioned on the Base-station-created precoding matrix can be made available at the base station in any mobile communication system, not limiting to the one that has the user terminal's antenna spacing larger than half-wavelength of the operational frequency. Therefore, the second exemplary embodiment is superior to the first exemplary embodiment in that it is applicable to wider range of mobile communication system conditions.

<Generalization and Variation of Embodiments>

Although the previous description on the second exemplary embodiment used specific examples of the base station and the user terminal having 4 and 2 antennas, respectively, the embodiment can be applied to any antenna configurations.

To generalize, under the condition that the number of antennas at the base station is always greater than the user terminal, the number of data layer and the dimension of the Interference pluses Noise covariance matrix solely depend on the number of antennas at the user terminal. That is to say, if the user terminal has M antennas, then, there will be M data layers and the Interference pluses Noise covariance matrix will have a dimension of M×M.

In this case, the base station can create the composite CSI reports request by specifying M different versions of Interference pluses Noise covariance matrix. Each version specifies different M non-zero elements and conforms to be an Hermitian matrix. The M non-zero elements condition ensures that the number of elements to be determined is the same as the number of SINR per data layer received from the user terminal according to one composite CSI report.

The Hermitian matrix condition ensures that the property of covariance matrix always holds and the resulting SINR per each data layer determined by the user terminal is always real and positive.

Variations of the exemplary embodiments are as follows, but not limited thereto.

One variation is the method to request and transmit the composite CSI reports. Instead of the base station using a single request as in the above described embodiments, it can use multiple requests transmitted over multiple time slots, wherein each request asks for different composite CSI report.

Similarly, instead of the user terminal transmitting the composite CSI reports in one shot, it can transmit each of the reports over multiple time slots.

Finally, as a general note for both the first and second exemplary embodiments, although the application in the TDD LTE system is assumed, the embodiments are not limited to only such application.

For example, in the FDD (Frequency Division Duplex) LTE system that uses a pair of carrier frequencies close together for uplink and downlink communication, the uplink-downlink channel reciprocity property still holds, and thus the present invention can also be applied.

It is noted that In PTL1-PTL3 in the citation list, there is not disclosed any arrangement in which a base station creates a relationship between a CSI report received from a user equipment and Interference pluses Noise covariance matrix that reflects amount of interference and noise observed at the user terminal's antennas; and the base station determines the Interference pluses Noise covariance matrix based on the created relationship; and the base station, using the determined Interference pluses Noise covariance matrix, estimates SINR for each data layer conditioned on the Base station-created precoding matrix.

Each disclosure of the above listed Patent Literatures and Non-Patent Literatures is incorporated by reference into the present document. Modifications and adjustments of embodiments and examples are possible within bounds of the entire disclosure (including the scope and range of each of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to technological concepts and the entire disclosure including the scope of the claims.

The invention claimed is:

1. A method in a mobile communication system comprising a base station communicating via a radio link with at least one user terminal, the method comprising:
   the base station, on reception of a Reference Signal (RS) transmitted from the at least one user terminal to the base station, estimating a downlink channel matrix from the base station of the at least one user terminal to create, based on the downlink channel matrix, a precoding matrix for applying to data to be transmitted to the at least one user terminal (Base station-created precoding matrix), the data of the at least one user terminal with the Base station-created precoding matrix applied thereto being made not to interfere with data of another user terminal;
   the at least one user terminal transmitting to the base station a Channel State Information (CSI) report representing a channel state for communication from the base station to the at least one user terminal, the CSI report including a precoding matrix created by the at least one user terminal and a Signal to Interference pluses Noise Ratio (SINR) estimated by the at least one user terminal conditioned on the precoding matrix created by the at least one user terminal;
   the base station, on reception of the CSI report from the at least one user terminal, creating a relationship between the Signal to Interference pluses Noise Ratio (SINR) estimated by the at least one user terminal in terms of the precoding matrix created by the at least one user terminal included in the received CSI report and an Interference pluses Noise covariance matrix that reflects an amount of interference and noise observed at a plurality of antennas of the at least one user terminal;
   the base station determining the Interference pluses Noise covariance matrix based on the created relationship; and
   the base station using the determined Interference pluses Noise covariance matrix and the Base station-created precoding matrix to estimate, based on the created relationship, a first Signal to Interference pluses Noise Ratio (SINR) for each data layer conditioned on the Base station-created precoding matrix.

2. The method according to claim 1,
wherein
the CSI report includes the SINR for each data layer conditioned on the precoding matrix created by the at least one user terminal.

3. The method according to claim 1, further comprising:
   the base station transmitting to the at least one user terminal a plurality of versions of CSI report requests specifying a plurality of versions of Interference pluses Noise covariance matrices with different elements, which are of interest to the base station; and
   the at least one user terminal creating the plurality of CSI reports by using the plurality of versions of the Interference pluses Noise covariance matrices specified by the base station to transmit the CSI reports to the base station.

4. A base station comprising:
   a plurality of antennas;
   a processor coupled to a memory storing therein program instruction codes executed by the processor, and the program instruction codes causing the processor to execute processing comprising:

de-multiplexing reception of Uplink by the plurality of antennas into reception of an Uplink Reference Signal (RS) and reception of a CSI report;

receiving the Uplink Reference Signal (RS) transmitted from each of the user terminal to the base station to obtain a downlink channel estimate from the base station of each user terminal;

creating, based on the downlink channel estimate, a precoding matrix for applying to data to be transmitted via the plurality of antennas to each user terminal (Base station-created precoding matrix), the data of each user terminal with the Base station-created precoding matrix applied thereto being made not to interfere with data of other user terminal;

receiving from each user terminal a Channel State Information (CSI) report including a precoding matrix created by the user terminal and a Signal to Interference pluses Noise Ratio (SINR) estimated by the user terminal conditioned on the precoding matrix created by each user terminal to create a relationship between the Signal to Interference pluses Noise Ratio (SINR) estimated by each user terminal in terms of a precoding matrix created by each user terminal included in the received CSI report and an Interference pluses Noise covariance matrix that reflects an amount of interference and noise observed at a plurality of antennas of each user terminal;

determining the Interference pluses Noise covariance matrix based on the created relationship; and estimating a Signal to Interference pluses Noise Ratio (SINR) for each data layer conditioned on the Base station-created precoding matrix, using the determined Interference pluses Noise covariance matrix and the Base station-created precoding matrix, based on the created relationship.

5. The base station according to claim 4, wherein the received CSI report includes:

the SINR for each data layer conditioned on the precoding matrix created by each user terminal.

6. The base station according to claim 4, wherein the program instruction codes cause the processor to further execute processing comprising:

transmitting to each user terminal a plurality of versions of CSI report requests specifying a plurality of versions of Interference pluses Noise covariance matrices with different elements, which are of interest to the base station.

* * * * *